Dec. 17, 1963  L. W. ZABEL ETAL  3,114,791
PAPERMAKING MACHINE
Filed Aug. 7, 1961  5 Sheets-Sheet 1

Dec. 17, 1963 L. W. ZABEL ETAL 3,114,791
PAPERMAKING MACHINE
Filed Aug. 7, 1961 5 Sheets-Sheet 2
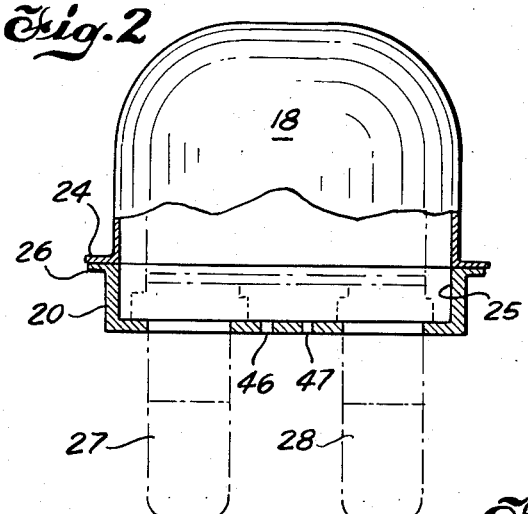
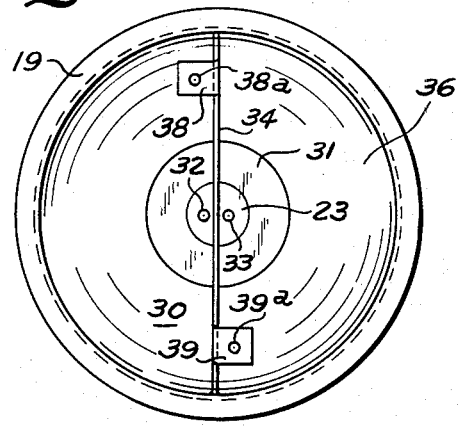
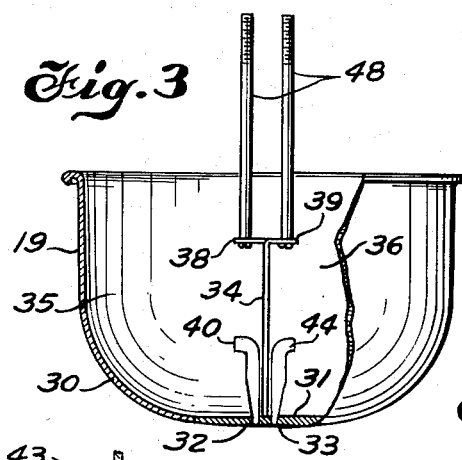
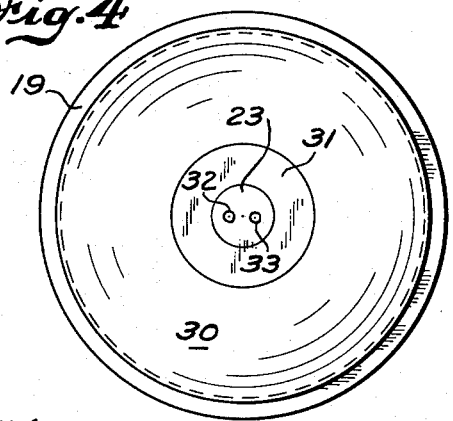
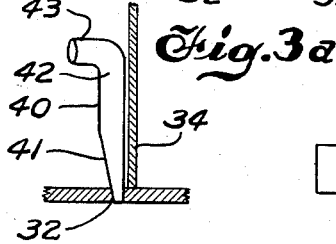
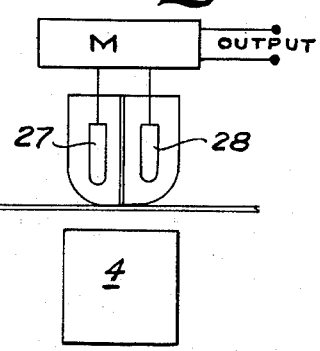
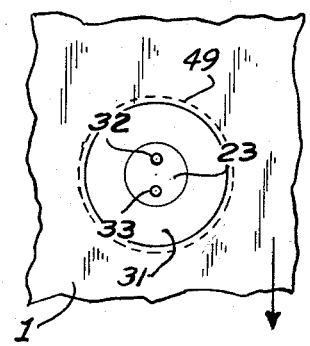

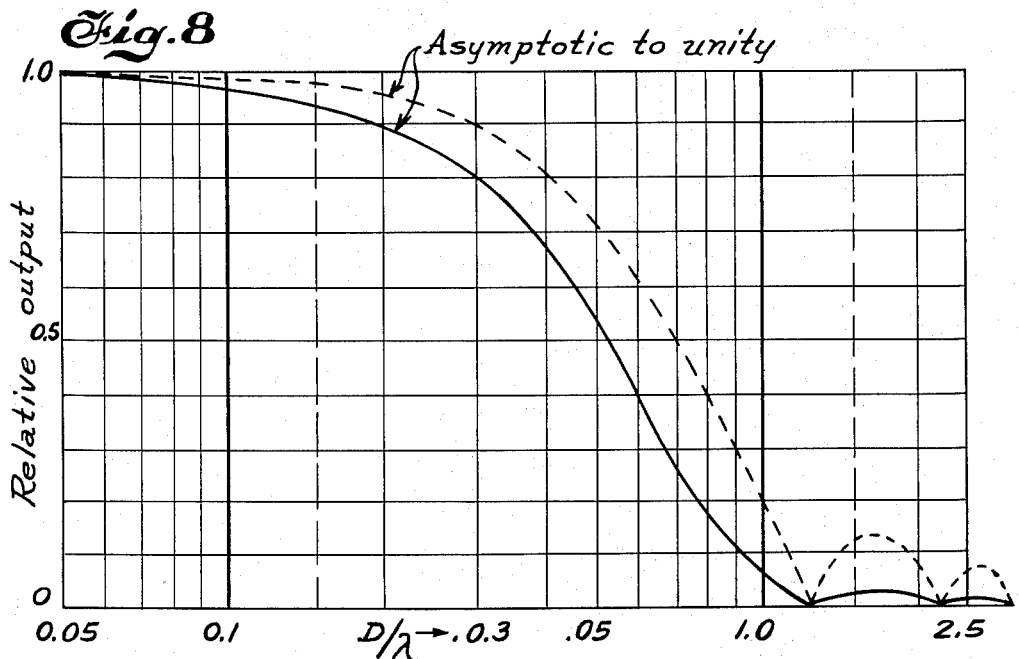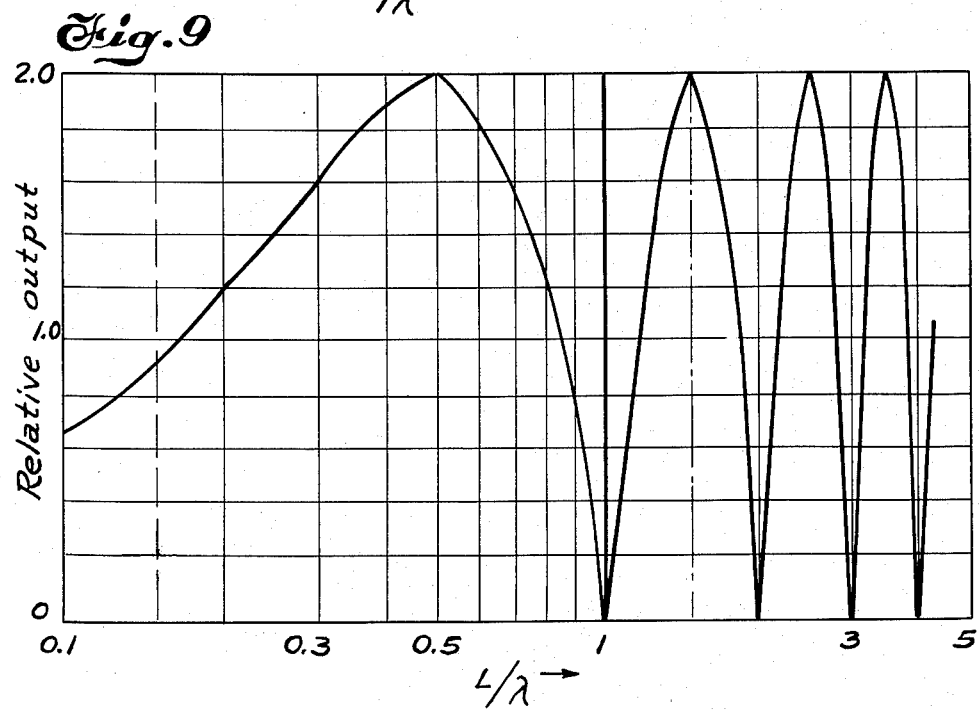

FREQUENCY CYCLES/SEC.

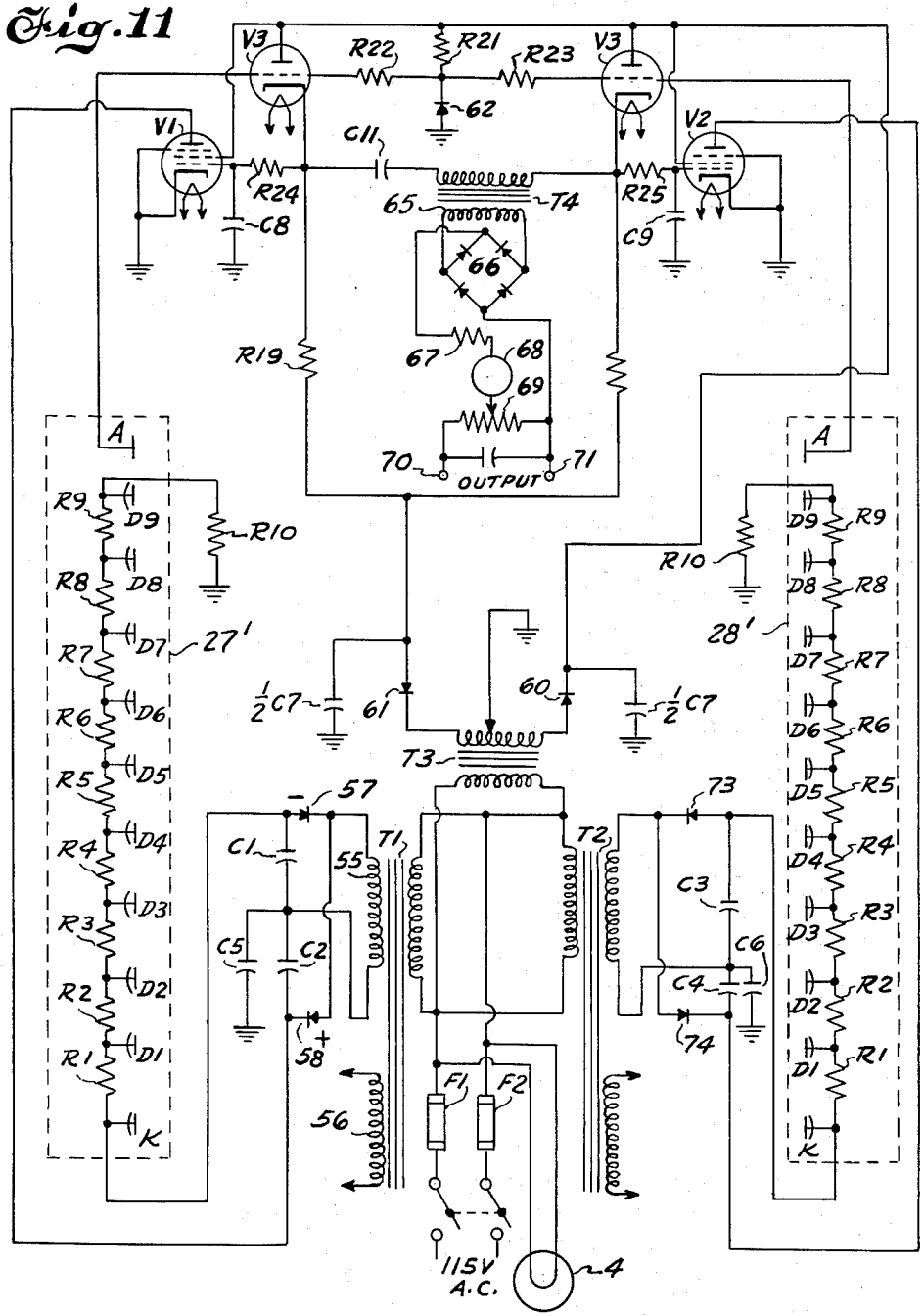

United States Patent Office 3,114,791
Patented Dec. 17, 1963

3,114,791
PAPERMAKING MACHINE
Lowell W. Zabel, George G. M. Eastwood, and Carl J. Moen, Neenah, Wis., assignors to Kimberly-Clark Corporation, Neenah, Wis., a corporation of Delaware
Filed Aug. 7, 1961, Ser. No. 129,869
6 Claims. (Cl. 88—14)

This invention relates to devices and methods for indicating variations in the properties of materials; in more specific aspect, the invention is directed to securing indications of paper formation as the paper is manufactured.

The invention has utility in many other applications, but, for the sake of convenience, will be specifically described in connection with its utilization in the manufacture of paper as the web passes through the paper machine.

Devices which scan paper to provide an indication of the formation, and, by interpretation, an indication of the strength and print quality, are known. Some such devices are used to scan only samples of the paper on an intermittent basis. Others are provided for use in continuous examination of the paper on the paper machine. In such equipment photoelectric means are employed, and the paper is scanned by a light spot, the light passing through the paper and being directed on to a photoelectric tube. The electrical output of the tube then fluctuates in general accordance with the changing density or translucency of the paper passing between the light spot and phototube. Suitable translation of the tube output by electrical means then provides an indication of sheet or web formation.

A major limitation of these prior art devices is that the electrical response of the system employed in translation is fixed as to its frequency characteristics. The signal derived from the phototube is, in essence, a combination of a direct current component and alternating current components. For a given single speed of the paper relative to the light spot, a judicious selection of these alternating current components provides an adequate representation of paper formation. However, the frequencies of the alternating current components vary directly with the speed at which the paper traverses the light spot and phototube; higher paper speeds result in higher electrical frequency outputs by the phototube. Accordingly, the band pass of the electrically responsive system tends to alter the selection of components and yields an output which is not uniform over a speed range of the traveling web; thus some signal effect is lost or gained as speed is changed, resulting in errors.

It is frequently desirable to change machine speed in paper manufacture in order to facilitate optimum paper formation under varying conditions or for other reasons; it is also desirable to have a device which may be moved from one machine to another having a different speed without having the speed difference of the machines influence the paper examination. The present invention contemplates the provision of a scanning system which accomplishes this purpose.

The invention further contemplates the provision of a novel method of continuously and differentially scanning media which are inherently subject to variation in some characteristics, such as the density variations in paper webs.

Additionally, a primary object of the invention is to describe a novel method for detecting, indicating and/or recording the severity of variations within a specific range of variables to which the structure of a material is susceptible.

A more specific object of the invention is to describe novel apparatus for the inspection on a continuous basis of webs of sheet material such as paper and which webs customarily exhibit area density variations throughout the sheet, the extent of which variations determines the quality or formation of the sheet.

In paper webs adequate formation is dependent upon the nature of the paper and specifically the purpose for which the paper web is intended. Webs are commonly manufactured from pulpwood and are comprised of intermeshed fibers of small length retained together primarily by the interlocking of the fibers. Webs intended for use in bookpaper, for example, have a more compact fiber arrangement than do webs intended for service as tissues. In each instance, however, the formation may vary from its intended limits resulting in a paper formation which is ill suited, or wild, for the particular purpose. Generally, the formation variation along the paper length is of primary interest in paper manufacture, as indicative of the paper quality.

The term paper formation refers both to the density of fiber concentration and to the size of areas of varying concentration throughout a web. Such variations may be examined visually by holding the paper in a strong light. In webs for bookpapers the areas of greater and lesser fiber concentration are relatively small and are spaced closely together; in webs for tissues, commonly termed "open," the fiber concentration is less than in bookpapers and the areas of varying density are usually larger and accordingly more widely spaced.

In essence, it is these areas of varying density and size which give rise to representative variations in the output of a phototube positioned to scan a paper web passing between a light source and the phototube. In effect, the density variations in the web are a function of distance or, in any given direction of scanning in the plane of the sheet, a complex of wavelengths giving rise to electrical frequency variations, which electrical variations, as already noted, are dependent upon speed of traverse of the web. This complex range of wavelengths is comprised of more fundamental wavelengths termed herein for convenience in description as equivalent wavelengths.

In the inspection and control of paper formation of any given type, the severity of the variations within a particular wavelength range is of primary interest. For any paper type a range of the equivalent wavelengths determines the adequacy of formation.

In the practice of this invention, as applied to a paper web, phototubes which serve as sensing elements of a scanning device are spaced apart in position to simultaneously sense somewhat different areas of a material under examination. The factors of sensing-element size and shape, sensing-element spacing, and the general equivalent wavelength character of the material to be examined, are correlated to provide the output response of a sensing system. The sensing system output itself is most suitably then measured and the device output is the signal obtained by rectification of the amplified difference of the individual phototube outputs.

Preferably, the sensing system of each phototube is identical, providing equivalent response over the applicable signal range. This result may be achieved by appropriate selection of components; alternatively, compensating means may be introduced, for example, into circuitry associated with the sensing system.

The range of interest of equivalent wavelengths in a particular type of paper, in accordance with the invention, determines both the sensing element characteristics and the spacing between sensing elements. Accordingly, the equivalent wavelength range to be sensed is first determined. The lower limit of the range of wavelengths to be sensed determines the size and configuration of each of the sensing elements. The upper limit of the range of wavelengths to be sensed determines the spacing between sensing elements. The selection of the range of wavelengths to which the system is to be responsive thus governs, in the differential sensing system, the parameters of the system. Due to the fact that the system is dependent upon length dimensions, the thus described system is within very considerable limits independent of speed of traverse of the material past the sensing elements if the measuring system to which the output of the phototubes is applied has a flat frequency response to the range of frequencies contained in the phototube signals.

A low output, as registered by an indicating instrument at the output terminals, indicates that in the signals sensed by he phototubes the components lying within the wavelength range determined by the sensor size and spacing are not large; the formation is "good." A high output indicates that all or some of these components have appreciable magnitude; the formation is poor.

In practice, to procure these results, the sensing element size and shape are, for example, selected to have an effective width somewhat less than the shortest wavelength of interest; and the center-line distance between sensing elements is selected to be the order of ½ of the wavelength of maximum interest. Under such conditions equivalent wavelengths which are approximately equal to and smaller than the effective width of the sensing element do not materially contribute to the output. Wavelengths longer than the center-line spacing contribute little to the output since they essentially cancel each other in the difference output. It is to be noted that a density variation corresponding to a given equivalent wavelength will provide, at different traverse speeds, outputs of different frequencies; however, such frequencies lie within the response of the system if the equivalent wavelength is within the equivalent wavelength range initially selected.

In the preferred practice of the invention, source light is directed to a phototube through an aperture of circular cross-section. The diameter of such aperture is then the effective width of the sensing element. Such contributes to simplicity of construction and maintenance. It is not essential to the practice of the invention that the spaced sensing elements successively sense the same area of the web. Since it is the severity of the paper formation variation which is being sensed rather than a specific measurement of density, disposition of the apertures laterally of each other is appropriate. However, if a paper web defect such as barring, that is, a regularly repetitive density variation, is suspected in the web, then the apertures should be disposed lengthwise on the sheet.

The apparatus of invention permits the paper web traversing the sensing elements to be engaged firmly at the area of sensing, as will be noted in the detailed description hereinafter. The arrangement inhibits web fluctuation in the area of the apertures and prevents ingress of stray light to the sensing elements.

Other features and objects of the method and apparatus of invention will be more fully understood from the following detailed description and accompanying drawings wherein:

FIG. 2 is an elevational view partially in section and somewhat enlarged illustrating the upper portion of the sensing head of FIG. 1;

FIG. 3 is a sectional view of the lower portion of the sensing head of FIG. 1;

FIG. 3a is an enlarged view of a detail of the structure of FIG. 3;

FIG. 4 is a bottom plan view of the sensing head of FIG. 1;

FIG. 5 is a top plan view of the lower portion of the sensing head of FIG. 1;

FIG. 6 is a block diagram view of the arrangement illustrated in FIG. 1;

FIG. 7 is a fragmentary view in plan on somewhat enlarged scale illustrating the relation of a paper web, a light spot directed to the web from a suitable source, and the sensing elements;

FIG. 8 is a graph showing curves illustrating the general relationship between the output per unit area of a sensing element and the ratio of the diameter D of the element to equivalent wavelength, the curves being an estimate based upon mathematical considerations;

FIG. 9 is a graph illustrating the relationship of differential output to the ratio of sensing element center distance spacing and equivalent wavelength, and is an exact relationship based upon mathematical considerations;

Figure 10:
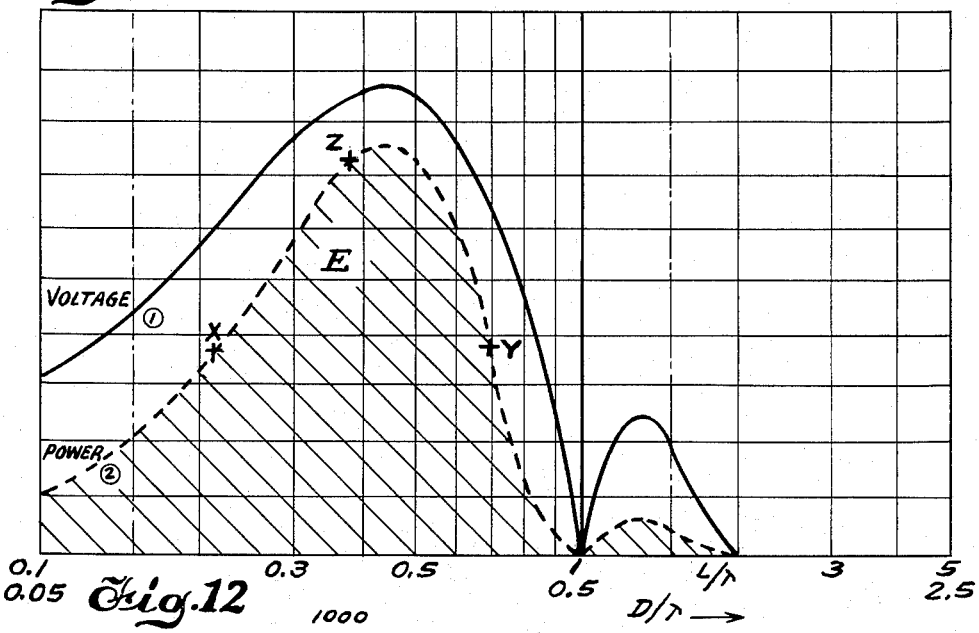
Figure 12:
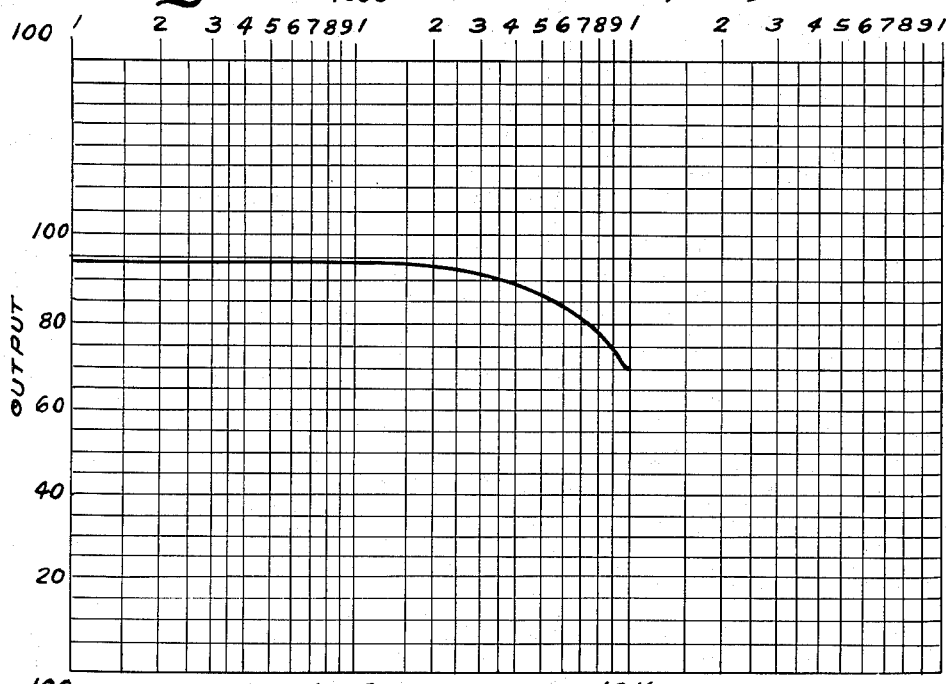

FIG. 10 includes the product of the graphs of FIGS. 8 and 9, and the square of this product;

FIG. 11 is a schematic diagram of a circuit useful in the practice of the invention;

FIG. 12 is a graph illustrating the electrical response of the system specifically described within a limited wavelength range.

Figure 1:
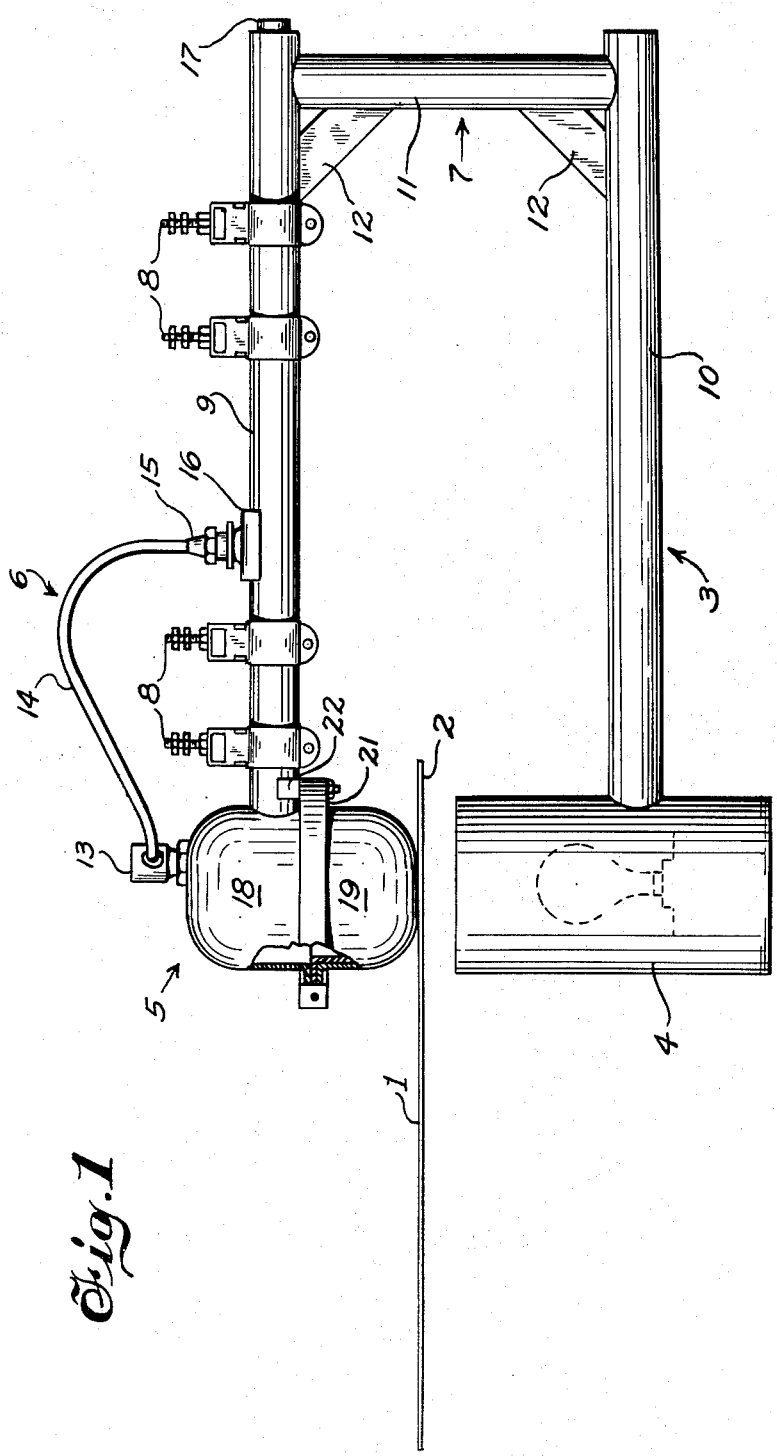
FIG. 1 is an elevational view partially in section illustrating apparatus of the invention with the sensing head of the apparatus in contact with a paper web which, as represented, is moving outwardly of the plane of the drawing.

Referring first to FIG. 1, the numeral 1 designates a paper web and, as illustrated, the web is considered to be on a paper machine and moving out of the plane of the drawing. Mounted adjacent the right hand edge 2 of the web 1 is a sensor device designated generally at 3. Basically, the sensor device comprises a housed light source 4, a sensor head 5, electrical conduit means generally designated at 6 for connecting the sensor head electrically to an output system, and a bracket 7 for structural support of the components. Hangers 8 provide for carrying the bracket 7 in any convenient manner, the hangers themselves being secured to the upper horizontally extending bracket arm 9.

The bracket 7 also comprises a lower bracket arm 10 and a vertically extending arm 11 which, as illustrated, is welded to each of the horizontally extending bracket arms and is so provided with corner supports 12 as to provide rigidity in the structure.

The lower bracket arm 10 supports at an extremity thereof the light source 4 which is positioned to direct a beam of substantially constant intensity upwardly toward the web 1 and the sensor head 5. The light source is suitably an ordinary incandescent lamp supplied from a 110 volt A.C. line.

The sensor head 5 is itself mounted at an extremity of the bracket arm 9 and includes a coupling 13 to which there is secured cable 14 of the generally designated conduit means 6; cable 14 is provided at its right hand extremity with a coupling 15 secured to the bracket arm 9 at 16, the cable passing inwardly (not shown) of the hollow arm 9 and to an output connector 17. The sensor head itself includes an upper casing portion 18, a lower casing portion 19, and an interior platform 20 (FIG. 2) supporting sensing components enclosed by the casing portions 18, 19, and to which components reference will be made in detail hereinafter in connection with the electrical circuit diagram.

A two-part grooved clamp 21 (FIG. 1) encircles the sensor head 5 centrally of its height, clamping the casing portions and platform together, and is itself rigidly fixed to and supported from bracket arm 9 by a suitable stud 22.

As will be noted from FIG. 1, the paper web 1 passes beneath the sensor head 5, and the head is so positioned that the bottom of the sensor head engages the upper surface of the paper web lightly but firmly such that the web lies smoothly against the sensor head.

Referring now to FIGS. 2–5 inclusive, the structural arrangement of the sensor head 5 is illustrated more in detail. Specifically, the platform 20 includes a hollow cylindrical mounting 25 having a protruding circular abutment lip 26. As illustrated in FIG. 2, casing portion 18 is adapted to extend over the mounting 25 and to enclose the mounting upwardly. Clamp 21 (FIG. 1) receives and retains peripheral edge 24 of casing portion 18 in position on lip 26.

Projecting from the mounting downwardly are a pair of phototubes 27, 28 in spaced relation. These phototubes are adapted to be enclosed by the lower casing portion 19 when it is positioned against the lower side of the abutment lip 26.

Referring now to FIG. 3, lower casing portion 19 is in the general form of a deep dish of substantially cylindrical configuration. The bottom 30 has an insert 31 welded thereto, and the insert includes very closely spaced apertures 32, 33. In the instance under specific consideration, the spacing between the center line of these apertures is 0.14 inch, and the apertures themselves each are of circular section and 0.07 inch in diameter. The insert 31 is planar in the immediate vicinity of the apertures 32, 33 (FIG. 3) and slopes gradually to its periphery, a feature which provides for smooth, vibrationless engagement of the web at the apertures. This planar zone, or the insert, is designated at 23 (FIG. 7).

Extending upwardly in the casing portion 19 midway between the apertures 32, 33 is a partition 34 providing a light barrier between the opposite compartments 35, 36 of the casing portion. The barrier 34 (FIG. 5) is soldered to the casing portion completely down the side walls and across the base of the casing portion to prevent any transfer of light between the compartments 35, 36 when the casing portion is mounted on the sensor head. For this purpose the barrier is cut to fit the shape of the bottom of the casing portion and is suitably of stainless steel. Tabs 38, 39 are provided integral with the barrier and are themselves apertured and threaded at 38a, 39a (FIG. 5) to receive bolts 48, to which further reference is made hereinafter, for the purpose of retaining the casing portion 19 on the sensor head.

Referring again to FIG. 3 and also to FIG. 3a, inwardly positioned of aperture 32 and cemented to the barrier 34 is a light-direction element 40 formed of glass for directing light to the phototube 27. The element 40 at its lower end 41 is of the same configuration as the aperture 32 and of the same diameter. Upwardly from the end 41 the element 40 includes a somewhat thicker lineal portion 42 (FIG. 3a) and an angularly extending portion 43. Accordingly, light passing through the lower end 41 travels upwardly through the portion 42 and is bent into the right angled portion 43 and then passes to the phototube.

As shown in FIG. 3, the compartment 36 has a similarly positioned light reflective element designated by the numeral 44 for directing light to the second phototube 28.

The lower end 41 of the light direction element 40 in the production of the sensor head is force fitted through the aperture 32 and the slight extension is then ground off; this insures that the element 40 will tightly fit the aperture and that all light will pass through the element without leakage. Additionally, in operation fluffs from the web will not block the aperture. Element 44 is similarly fitted.

It will now be appreciated that the casing portion 19, when brought into position against the lower side of the platform 20, will be so arranged that light passing from the elements 40 and 44 will be directed to the phototubes 27, 28 respectively. The barrier 34 will, of course, engage the lower surface of platform 20 to prevent light passage between compartments 35, 36. For this purpose the hollow or dish mounting 25 is provided in its base with spaced bolt holes 46, 47 which coincide respectively with the threaded openings of tabs 38, 39 to permit the reception of threaded bolts 48 which draw the lower casing portion 19 into secure contact with the lip 26.

FIG. 6 is a block diagram arrangement of the essential equipment of FIG. 1, and the web 1 is illustrated as moving transversely to the direction shown in FIG. 1. As generally indicated, the light source 4 is of sufficient width to provide on the sheet 1 a circle of light indicated at 49 (FIG. 7) which is greater than the area of the sensor head in contact with the web. Thus, the phototubes 27, 28 are exposed to the light intensity from a common source when the web is not over the sensing head. The outputs of each phototube, each of which, in practice, is a photomultiplier, are applied to an output circuit system (FIG. 11); and a differential output is derived from measuring circuitry designated broadly at M in FIG. 6 and shown in detail in FIG. 11.

Referring now to FIG. 11, the equipment is illustrated as powered from a 115 v. A.C. line, the equipment being protected by suitable fuses F1, F2.

The source light 4, also protected by the fuses, is provided across the line and suitably, as already noted, is a single coil filament incandescent lamp.

The power supply includes three transformers designated T1, T2 and T3. T1 and T2 are identical transformers connected in a similar manner into the circuit and accordingly, reference to the connections and operation of T1 only will be made in detail. Also, since each ½ of tube V3 of the circuit is similar and is similarly connected for convenience, reference will be made in the detailed description to V3 as the component for each side.

T1 includes a high voltage secondary winding 55 and a step down winding 56, the latter for supplying filament voltages in a customary manner. The output of winding 55 is rectified utilizing semiconductor diodes 57, 58; the rectifier network is a voltage doubler having capacitors C1, C2 and C5, the latter of which is grounded.

Cathode K of the photomultiplier tube, which may be an RCA 931-A type, is connected to the negative side of the power supply. The positive side of the supply is directly connected to the anode of control tube V1. The photomultiplier tube also includes dynodes, or multiplier electrodes, D1 to D9; a voltage divider of sections of equal resistance value designated R1 to R9 is shielded, as is the phototube as indicated in dotted lines at 27. This divider is, in practice, however, physically located outside of the photomultiplier tube.

The voltage divider is grounded through resistor R10 and is thus in electrical series connection with the negative side of the high voltage power supply, control tube V1, and the positive side of the high voltage power supply. Alternatively, R10 may be eliminated and the dynode D9 may be direct connected to the negative side of the power supply of the measuring circuit arrangement now to be discussed; in either event, the potential of anode A must be sufficiently greater than that of dynode D9 to attract substantially all of the electrons to the anode from the dynode.

The center tap of the secondary of transformer T3 is grounded, and a half wave rectified output is derived by means of each of diodes 60, 61. This output supplies the plate voltage of cathode follower V3 (at substantially 100 volts), the negative side at −100 volts being connected to the cathode of V3. Additionally, 100 volts is applied across resistor R21 and Zener diode 62 in such manner as to provide a positive voltage (20 volts) at the resistor-diode junction. A resistor R22 is also connected to this junction and serves as the load resistor in the anode circuit of multiplier 27.

The anode A of the photomultiplier is direct connected with the grid of V3 and current flow from anode A through R22 varies the bias of V3, resulting in current amplification in the V3 cathode, V3 serving as a cathode follower.

The grid of control tube V1 is connected with the cathode of V3 via resistor 24, and the grid circuit includes a filter of long time constant formed by R24 and C8. R24 may have a value of 4.3 megohms, for example, while C8 may be a paper capacitor having a value of 2 mfd. giving a time constant of about 8.6 sec. Accordingly, the grid of V1 will respond to slow variations in voltage change in the cathode of V3 but will not be affected by more rapid changes as noted hereinafter.

In the operation of the circuit as thus far described, V3 and V1 are normally conductive when power is applied to the circuit. As the light intensity on the phototube 27 increases, the dynodes emit more electrons and the phototube current through anode A increases, thereby increasing the voltage drops across R22 and decreasing the grid voltage of tube V3. As the current to the V3 plate decreases, the V3 cathode voltage drops; if the rate of change is not too rapid, this causes a control grid voltage drop on the grid of V1. As the grid voltage falls, conductivity through V1 falls, thereby decreasing the current flow through resistors R1 to R9; this drop in voltage on each of the dynodes decreases the gain of the photomultiplier tends to decrease the current flow to the anode of the phototube. The result of this rate-dependent negative feedback arrangement is that the postulated increase in light intensity, if at a low rate, produces only a negligible net increase in the phototube current. Because of the high time constant of C8 and R24, this feedback is effective for D.C. and low frequency components, typically below $$\frac{1}{(2\pi)(8.6)}$$

cycles per second, only; the net effect of this arrangement is to maintain the average value of phototube current substantially constant while the phototube current and the out-of-phase amplified current of V3 vary in accordance with the higher frequency components of the fluctuating light intensity on the phototube.

The load resistor for the photomultiplier, R22, is isolated from the control grid of the control tube V1 by the cathode follower V3. This isolation minimizes the capacity from the phototube anode and ground. The effect is to extend the high frequency response of the system. The use of the cathode follower also assures that there are no auxiliary impedance paths from the phototube anode to ground. This results in the largest range of linear operation of the phototube output.

The amplified current then develops across resistor R19 in the cathode of V3 an output reflective of all but the very lowest frequency components of the changes in light intensity on the phototube, the voltage at the upper end of R19 (FIG. 11) rising and falling above and below its independently-selected average value in accordance with these fluctuations in the current flow.

The voltage developed across R19 arises from a fluctuating D.C. current. Capacitor C11 in the output circuit is relatively large (suitably 1 microfarad) and effective to block D.C. while all desired frequency components of the voltage fluctuation are passed and occasion a varying current in the primary of transformer T4. This transformer T4 has typically a 1:1 ratio and serves to isolate the described circuit from ground.

The signal received from phototube 27 through its associated circuitry has been described. As noted, a similar signal is derived from the output of phototube 28 and its associated circuitry; this latter arrangement includes the transformer T2; diodes 73, 74; capacitors C3, C4, C6; control tube V2; and current amplifier V3 (right side, FIG. 11). The right side of V3, like the left side, is provided as a cathode follower, and the output signal is fed to the primary of T4, C11 serving as a blocking capacitor to D.C. in the cathode circuit.

The secondary 65 of transformer T4 is connected to the input of a full wave rectifier 66; the output circuit of rectifier 66 includes resistor 67, ammeter 68, and output resistor 69. A relatively large capacitor (500 microfarads) is connected across resistor 69 and serves to provide an average output at terminals 70, 71 of the signals received.

Thus the net signal to T4 is a differential signal representing the difference in light intensity on the phototubes at any given instant of time. This net signal is rectified and the average output across terminals 70, 71 may be applied to a recorder. In usual operation the recorded signal will be at a minimum in value if the paper formation is good and if the aperture size and center-line distance between apertures have been appropriately selected with relation to the formation which is desired for the paper being scanned.

Suitably, the V1 tubes, V3 and Zener diode are mounted within the dish-shaped mounting platform 20 beneath the casing portion 18. Conveniently, the transformers T1, T2, and T3, as well as the capacitors and associated circuitry are mounted on a separate chassis (not shown).

FIG. 12 illustrates the response of the electrical system described between 100 cycles per second and 10,000 cycles per second. As will be noted, the response is substantially flat over a wide range from about 100 cycles to nearly 10,000 cycles. The response characteristic between 30 and to above 100 cycles (not shown) is also flat; for this purpose transformer T4 is selected to have a flat response. Such transformers are commercially available. The slight fall-off at the upper stated limit is attributed to interelectrode and stray wire losses in the circuitry and may readily be eliminated by circuit modification for applications requiring absolutely flat response in the higher electrical frequency range.

With the system specifically described wherein the aperture sizes are 0.07 inch and the center-line distance is 0.14 inch, the electrical frequencies derived will include those between approximately 30 and 100 cycles per second at 100 feet per minute paper speed. At 1000 feet per minute paper speed, the electrical frequencies will include those from about 300 to about 1000 cycles per second for the same equivalent wavelength range. It will be noted that the electrical response is substantially uniform in amplitude of output, not only over the range 30 to 1000 cycles per second, but over a wider range such as to permit measurements at paper speeds between approximately 100 and 3000 feet per minute without material attenuation; such range could be extended by revised circuit design if desired.

In effect, the arrangement described provides a filter of shifting band pass on a frequency scale, but of a constant band pass on a distance scale. By means of discriminating between wanted and unwanted frequencies on the basis of distance or equivalent wavelength rather than frequency itself, speed and time are substantially eliminated as factors in the output; such discrimination is attained when the range of wavelength interest is the basis of the device parameters selected.

The output energy is represented by the area E beneath the response curve shown in FIG. 10. This response curve is the square of the product of the response curves illustrated in FIGS. 8 and 9. These curves are representative of the conditions and illustrate the manner of selecting the aperture size and spacing of the apertures, but it is to be understood that, while FIG. 9 is exact, FIG. 8 is an estimate, portraying typical dependencies on aperture. FIG. 8, on a semilogarithmic scale and based upon the utilization of an aperture of circular cross-section, illustrates the relationship of output to equivalent wavelength as the diameter of the aperture is changed relative to equivalent wavelength. As will be noted, when the diameter is small relative to the length of the variation sensed (equivalent wavelength), the output is high; however, as the ratio of diameter D and equivalent wavelength $\lambda$ approach unity, the output falls sharply. Beyond unity, secondary maxima occur in the response but are substantially negligible in their effect on output.

FIG. 9 is the plot of $$\left| \sin \frac{\pi L}{\lambda} \right|$$

as a function of $$\frac{L}{\lambda}$$

and illustrates that at low values of center-line spacing L relative to the wavelength sensed, the output is low but rises to a maximum, falling off again sharply as the center-line spacing and equivalent wavelength approach unity. As is clear from FIG. 9, maximum response is secured when the center-line distance is one-half the wavelength desired to be sensed and secondary maxima of equal amplitude occur beyond unity. In the practice of this invention positive steps are taken, as noted in the previous discussion of FIG. 8 as well as hereinafter, to minimize all or a portion of these secondary maxima, as desired.

Accordingly, by choosing the sensor element of definite dimension relative to the shortest equivalent wavelength to be sensed, and by selecting the center-line distance of definite dimension relative to the largest equivalent wavelength to be sensed, a desirable wavelength band pass may be secured (FIG. 10).

In the selection of the parameters for the particular embodiment described, the ratio of $L/D$ was selected to be 2 in order to materially minimize the effect of the contributions of the secondary maxima of FIG. 9 to output.

Referring to FIG. 10 wherein the voltage curve is the product of FIGS. 8 and 9, and the power curve is the square of the voltage curve, the upper and lower limits X and Y of the effective pass band are chosen at the half power values. The mid value of the effective pass band is the geometric mean of these limits and in the particular power curve (FIG. 10) falls at Z; at point X $L/\lambda$ has the value 0.22; at point Y $L/\lambda$ has the value 0.69 and at point Z $L/\lambda$ has the value 0.39. The middle of the range of interest in the examination of bookpaper is considered to lie at $\lambda = \sqrt{1/8}$ inch. Such is an approximation which generally relates the device of this invention to visual inspection methods; this is a somewhat arbitrary criterion since visual inspection methods themselves are subject to variation. But for the purposes of this invention and for the purpose of illustrating the calculation the selection of this midpoint wavelength has been found appropriate. Since $L/\lambda$ for the midpoint is 0.39 and since $\lambda$ for the midpoint is $\sqrt{1/8}$, L is seen to be about 0.14 inch for the conditions stated. Accordingly, D calculates to 0.07 inch. Subject to relatively minor limitations in the estimated curves, the effective pass band is thus seen to be from 0.20 to 0.64 inch.

The response of the device, due to the fact that the energy curve (FIG. 10) does not have vertical sides and a completely flat response within the band, contains signals beyond the specific limits X, Y. Thus, while discrimination is not 100%, the discrimination of the so-called distance filter is constant and, accordingly, the response does not change with speed.

It will be appreciated in the use of the curves of FIGS. 8–10 inclusive that FIGS. 8 and 9 are applicable to substantially all situations, while FIG. 10 is restricted to situations in which $L/D=2$. Accordingly, for situations in which $L/D$ has other values, a new curve analogous to that of FIG. 10 is prepared by reference to FIGS. 8 and 9.

It will also be understood that the wavelength filtering response is not as sharp or as symmetrical as that of a typical good band pass electrical filter. Range of band-widths is attained only at the expense of smoothness of response.

In the practice of the method of invention, the paper web as it is formed on the papermaking machine is drawn continuously across the light-impervious sensor head and signals are derived as already described. The web is tensioned slightly by the imposition of the sensor head and also by the configuration of the bottom wall of the head. This assures of firm engagement of the web and head.

Additional advantages of the differential system are inhibits extraneous signals in the device. that extraneous signals such as those occasioned by power supply ripple, ambient conditions of temperature, and the like are effectively cancelled and are not reflected in the output.

It will be understood that this invention is susceptible to modification in order to adapt to different usages and conditions and, accordingly, it is desired to comprehend such modifictaions within the invention as may fall within the scope of the appended claims.

What is claimed is:

1. Apparatus for sensing the severity of variations in the formation of a traveling light-transmissive sheet and which variations in formation are characterized by a range of equivalent wavelengths, said apparatus comprising a light-impervious sensing head having a wall across which said sheet is drawn, said wall having a pair of spaced apertures in a planar zone of the wall bounding the said apertures for engaging the sheet as it is drawn over the said apertures, said apertures having a predetermined effective width and spacing which limit the range of equivalent wavelengths to be sensed, first and second light-sensitive means shielded from each other within the housing and each for producing a variable current flow representative of variations in the transparency of the sheet as the sheet is drawn across said apertures, one light-sensitive means being exposed to one of each of the said apertures, light source means for projecting light of the same intensity towards the apertures and to a sheet moving over the apertures, electrical circuit means having a substantially flat frequency response to the variable current flow of the light-sensitive means at the traversing speed of the sheet over the said apertures of predetermined width and spacing, said electrical circuit means including means for connecting the variable current flows of the light-sensitive means in opposition to produce a resultant alternating current in which the current energy varies in accordance with rapid variations in the light transmission of the sheet as the sheet traverses the apertures, and means for measuring the energy of said resultant alternating current.

2. A monitoring device for determining the severity of variations in the formation of a moving light-transmissive web of paper and which variations in formation are characterized by a range of equivalent wavelengths, the said device comprising, in combination, means for illuminating the web to be monitored with light directed substantially perpendicularly to the surface of the web whereby light is transmitted through the web in substantially inverse relation to the density of the web, a sensing head positioned in the path of said illuminating means and having a wall exposed to said illuminating means over which said traveling web passes, said wall including a pair of apertures spaced apart in a common plane in the direction of web travel, said apertures having a predetermined effective width and spacing such that the effective width of each aperture is substantially one-half the said spacing, means including phototubes disposed in the path of light passing through the said web and each of said apertures, a power source for each of said phototubes whereby each phototube produces variable electrical signals indicative of the varying density conditions of the portions of the web surveyed by the respective apertures, circuit means connected to each said phototube for deriving an amplified variable electrical current flow as a result of the exposure of said phototubes to said illuminating means, said circuit means being effective to indicate the varying values of the signals and having a substantially flat frequency response to the variable electrical current flow of each phototube at the speed of the web over the said apertures of predetermined width and spacing, other means for blocking the D.C. current component of the output signal of each of said phototubes, means for coupling the variable electrical currents of the phototubes in opposition to produce a resultant alternating current reflective of the difference in density conditions of the portion of the web surveyed, and means for coupling an instrument to the said device for securing an indication of the value of the differential component of said signals.

3. In a process of sensing place to place variations in a property of a material traveling relative to a scanning device and in which material variations with length induce in spaced sensing elements of the scanning device an output response from each element representative of the property of the material over an incremental area of the material, the steps of subtracting the output response of the sensing elements, spacing the sensing elements to substantially limit the response of the combination of the sensing elements to a variation below a certain maximum length variation, selecting the sensing dimension of each sensing element to limit the response of the elements length variations above a certain minimum, which minimum is below said maximum, drawing the material substantially continuously lengthwise of said elements in succession while developing the output responses in accordance with the variations in the said property of the material, and deriving by said subtraction of the output responses a differential signal representative of the said property difference in the incremental areas sensed, and continuously sensing incremental areas over the length of said material.

4. In a process of sensing variations in paper formation in a length of traveling paper web, in which web the variations in formation with length induce in spaced photo-electric elements an output response from each element, the steps of providing comparator circuit means which connects the photo-electric elements outputs in opposition, spacing the photo-electric elements to substantially limit the response of the combination of the elements to variations characterized by equivalent wavelengths below a certain maximum, selecting the sensing dimension of each sensing element to limit the response of the elements to variations characterized by equivalent wavelengths above a certain minimum equivalent wavelength, which minimum is below said maximum, drawing a web substantially continuously lengthwise of said elements while directing light through said web to said elements, and deriving from the said comparator circuit a differential signal reflective of the range of equivalent wavelengths in the formation variation in said web over the web length.

5. In a process of sensing variations in formation in a length of a web, in which traveling web the variations in formation with length induce in spaced photo-electric elements an output response from each element in the form of electrical signal variations, the steps of substantially continuously drawing the said web successively across the sensing elements, providing comparator circuit means having a flat frequency response and which circuit means connects the photo-electric elements outputs in opposition, so correlating the factors of sensing element effective width and sensing element spacing with the range of equivalent wavelengths to be sensed that the corresponding frequency components of the electrical signal variations resulting from the passage of the web across the photo-electric elements fall within the flat response limits of the circuit means, and deriving a resultant output from the comparator circuit means, whereby the said output is substantially independent of the web speed across the sensing elements.

6. In a process of sensing variations in paper formation, in a length of traveling paper web, in which web the variations in formation with length induce in spaced photo-electric elements an output response from each element, the steps of providing comparator circuit means having a flat frequency response and which connects the photo-electric elements outputs in opposition, spacing the photo-electric elements to substantially limit the response of the combination of the elements to length variations characterized by equivalent wavelengths below a certain maximum equivalent wavelength, selecting the sensing dimension of each sensing element to limit the response of the elements to variations characterized by equivalent wavelengths above a certain minimum, which minimum is below said maximum, drawing a web substantially continuously lengthwise of said elements in succession while directing light through said web to said elements, and deriving from the said comparator circuit a differential signal reflective of the range of equivalent wavelengths in the formation variation in said web over the web length.

References Cited in the file of this patent

UNITED STATES PATENTS

| | | |
|---|---|---|
| 2,254,932 | Bryce | Sept. 2, 1941 |
| 2,413,218 | Coroniti | Dec. 24, 1946 |
| 2,617,048 | Wagner et al. | Nov. 4, 1952 |
| 2,849,623 | Drake | Aug. 26, 1958 |
| 2,987,182 | Ator et al. | June 6, 1961 |

UNITED STATES PATENT OFFICE
CERTIFICATE OF CORRECTION

Patent No. 3,114,791                            December 17, 1963

Lowell W. Zabel et al.

It is hereby certified that error appears in the above numbered patent requiring correction and that the said Letters Patent should read as corrected below.

Column 1, line 63, for "characteristics" read -- characteristic --; column 3, line 14, for "he" read -- the --; column 8, lines 74 and 75, the term should appear as shown below instead of as in the patent:

$$2 \left| \sin \frac{\pi L}{\lambda} \right|$$

Signed and sealed this 16th day of June 1964.

(SEAL)
Attest:

ERNEST W. SWIDER                            EDWARD J. BRENNER
Attesting Officer                           Commissioner of Patents